US012700584B2

(12) United States Patent
Chen et al.

(10) Patent No.: US 12,700,584 B2
(45) Date of Patent: Aug. 4, 2026

(54) CATHODE MATERIAL AND PREPARATION METHOD THEREOF, COMPOSITE CATHODE MATERIAL, AND BATTERY

(71) Applicant: BYD COMPANY LIMITED, Guangdong (CN)

(72) Inventors: Na Chen, Shenzhen (CN); Zewen Ruan, Shenzhen (CN); Yecheng Tian, Shenzhen (CN); Xuanwei Deng, Shenzhen (CN); Nan Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 693 days.

(21) Appl. No.: 18/154,660

(22) Filed: Jan. 13, 2023

(65) Prior Publication Data

US 2023/0163280 A1      May 25, 2023

Related U.S. Application Data

(63) Continuation of application No. PCT/CN2021/087569, filed on Apr. 15, 2021.

(30) Foreign Application Priority Data

Jul. 15, 2020      (CN) .......................... 202010681792.9

(51) Int. Cl.
| | |
|---|---|
| *H01M 4/36* | (2006.01) |
| *C01G 53/50* | (2025.01) |
| *H01M 4/505* | (2010.01) |
| *H01M 4/525* | (2010.01) |
| *H01M 4/02* | (2006.01) |

(52) U.S. Cl.
CPC ............ *H01M 4/366* (2013.01); *C01G 53/50* (2013.01); *H01M 4/505* (2013.01); *H01M 4/525* (2013.01); *C01P 2002/50* (2013.01); *C01P 2004/50* (2013.01); *C01P 2004/61* (2013.01); *C01P 2004/84* (2013.01); *C01P 2006/40* (2013.01); *H01M 2004/021* (2013.01); *H01M 2004/028* (2013.01)

(58) Field of Classification Search
CPC ...... H01M 4/366; H01M 4/505; H01M 4/525; H01M 2004/028; C01G 53/50
See application file for complete search history.

(56) References Cited

U.S. PATENT DOCUMENTS

| | | | | |
|---|---|---|---|---|
| 11,289,691 B2* | 3/2022 | Zhou | ..................... | H01M 4/525 |
| 11,349,121 B2* | 5/2022 | Hiratsuka | ............. | H01M 4/485 |
| 12,057,576 B2* | 8/2024 | Dou | ...................... | H01M 4/366 |
| 2016/0013480 A1* | 1/2016 | Sikha | .................... | H01M 4/043 |
| | | | | 427/126.6 |
| 2020/0068624 A1* | 2/2020 | Xu | ......................... | H04W 24/08 |
| 2020/0083524 A1* | 3/2020 | Baek | ..................... | H01M 4/525 |
| 2020/0185712 A1 | 6/2020 | Hiratsuka | | |
| 2021/0126256 A1* | 4/2021 | Shin | .................. | H01M 10/0525 |
| 2021/0408528 A1* | 12/2021 | Chae | ...................... | C01G 53/04 |
| 2023/0081761 A1* | 3/2023 | Hiratsuka | ............. | H01M 4/131 |
| | | | | 429/231.95 |

FOREIGN PATENT DOCUMENTS

| | | | | | |
|---|---|---|---|---|---|
| CN | 10584062 A | | 11/2009 | | |
| CN | 107910534 A | | 4/2018 | | |
| CN | 109742344 A | | 5/2019 | | |
| CN | 109742376 A | | 5/2019 | | |
| CN | 110265631 A | | 9/2019 | | |
| CN | 110890525 A | | 3/2020 | | |
| CN | 111384371 A | | 7/2020 | | |
| CN | 115053360 A | * | 9/2022 | ........... | H01M 4/366 |
| JP | 2000133246 A | | 5/2000 | | |
| JP | 2016139569 A | | 8/2016 | | |
| JP | 2020070211 A | * | 5/2020 | | |
| KR | 20190092824 A | * | 8/2019 | ............. | C01G 53/44 |
| KR | 20210007808 A | * | 1/2021 | ........... | H01M 4/366 |
| WO | 2020085731 A1 | | 4/2020 | | |

OTHER PUBLICATIONS

Machine translation of JP 2020-070211 (no date) (Year: 0000).*
English translation of International Search Report from PCT/CN2021/087569 dated Jun. 30, 2021 (2 pages).

* cited by examiner

*Primary Examiner* — Amanda C. Walke
(74) *Attorney, Agent, or Firm* — Calfee, Halter & Griswold LLP

(57) ABSTRACT

The present disclosure provides a cathode material including multiple composite secondary particles, each of the composite secondary particles including multiple primary cathode material particles, where the composite secondary particles meet: $0.9 \leq 0.1 D/A + B*C \leq 20$ (Relation 1). In which A represents a particle size D50 of the primary cathode material particles, unit: $\mu m$; B represents a particle size D50 of the composite secondary particles, unit: $\mu m$; C represents a specific surface area of the composite secondary particles, unit: $m^2/g$; and D represents a number of the primary cathode material particles in each of composite secondary particles.

6 Claims, No Drawings

CATHODE MATERIAL AND PREPARATION METHOD THEREOF, COMPOSITE CATHODE MATERIAL, AND BATTERY

CROSS-REFERENCE TO RELATED APPLICATIONS

The present disclosure is a bypass continuation application of the PCT international application No. PCT/CN2021/087569, filed Apr. 15, 2021, which claims priority to Chinese Patent Application No. 202010681792.9 filed by BYD Company Limited on Jul. 15, 2020 and entitled "Cathode material and preparation method thereof, composite cathode material, and battery", the entire contents of which are incorporated herein by reference.

FIELD

The present disclosure relates to the technical field of batteries, and specifically to a cathode material and a preparation method thereof, a composite cathode material, and a battery.

BACKGROUND

At present, two popular designs of cathode materials are available in the market. One is composed of one or a few (not more than 5) primary particles. This material has the advantages such as good structural stability, good cycling performance, and less gas production during storage, and also some disadvantages such as low capacity, high battery impedance and poor power at the same ratio of metal. The other is a secondary particle material composed of many primary particles. This material also has many problems. For example, in the secondary particle materials with the same particle size, the more primary particles lead to too small particle size and large specific surface area of the primary particles, serious side reactions with the electrolyte solution, and gas production. The secondary particle material is prone to breakage upon compaction, and has poor cycle performance, thermal stability and safety.

SUMMARY

The present disclosure aims to at least solve one of the technical problems in related art. To this end, the present disclosure proposes a cathode material enabling a battery to have a better stability.

A cathode material is provided, which includes multiple composite secondary particles, where each of the composite secondary particles includes multiple primary cathode material particles, and the composite secondary particles meet Relation 1:

$$0.9 \leq 0.1 D/A + B^*C \leq 20 \qquad \text{(Relation 1)}$$

where A represents a particle size D50 of the primary cathode material particles, unit: $\mu m$; B represents a particle size D50 of the composite secondary particles, unit: $\mu m$; C represents a specific surface area of the composite secondary particles, unit: $m^2/g$; and D represents a number of the primary cathode material particles in each of the composite secondary particles.

Therefore, in the composite secondary particles in the cathode material provided in the present disclosure, the particle size D50 of the primary cathode material particles, the particle size D50 of the composite secondary particle, the specific surface area of the composite secondary particles, and the number of the primary cathode material particles in each of the composite secondary particles are set to meet the above Relation 1. A battery prepared with the cathode material has a low battery impedance, a high retention rate of cycle capacity, and a low rate of change in thickness. These indicate that the battery has less gas production, less side reactions occur between the cathode plate and the electrolyte solution, and the battery has better stability.

A method for preparing a cathode material, which includes:

mixing a first precursor and a second precursor and pre-sintering, to obtain a pre-sintered mixture; and subjecting the pre-sintered mixture to first sintering and then to first crushing, to obtain a cathode material including multiple composite secondary particles, where each of the composite secondary particles includes multiple primary cathode material particles.

A composite cathode material is provided, which includes a cathode material as described above and a coating on a surface of the cathode material.

A battery is provided, which includes a cathode plate including a current collector and a cathode active material layer is disposed on the current collector, where the cathode active material layer includes a composite cathode material as described above.

Other aspects and advantages of the present disclosure will be given in the following description, some of which will become apparent from the following description or may be learned from practices of the present disclosure.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

It is to be understood that the terms "first" and "second" are used herein for purposes of description, and are not intended to indicate or imply relative importance or implicitly point out the number of the indicated technical feature. Therefore, the features defined by "first", and "second" may explicitly or implicitly include one or more features. Further, in the description of the present disclosure, unless otherwise stated, "multiple" means two or more than two.

According to the embodiments of the present disclosure, the cathode material includes multiple composite secondary particles, where each of the composite secondary particle includes multiple primary cathode material particles; and the composite secondary particles meet Relation 1 below:

$$0.9 \leq 0.1 D/A + B^*C \leq 20 \qquad \text{(Relation 1)}$$

where A represents a particle size D50 of the primary cathode material particles, unit: $\mu m$; B represents a particle size D50 of the composite secondary particles, unit: $\mu m$; C represents a specific surface area of the composite secondary particles, unit: $m^2/g$; and D represents a number of the primary cathode material particles in each of composite secondary particles.

In the charge and discharge process of the battery, lithium ions are deintercalated/intercalated in the cathode material and anode material. The detercalation/intercalation rate of lithium ions affects the electrical performances of the cathode material. In the present disclosure, the particle size D50 of the primary cathode material particles is directly related to the length of the diffusion path of lithium ions in cathode material. If the particle size D50 of the primary cathode material particles is too large, the diffusion path of lithium ions will be extended, resulting in a low capacity of the material and an increased impedance of the battery. If the particle size D50 of the primary cathode material particles is too small, more primary cathode material particles will be included in a composite secondary particle with the same particle size D50, such that the specific surface area of the composite secondary particle is increased, causing increased side reactions between the composite secondary particles and the electrolyte solution, serious gas production, and deteriorated cycle performance of the battery.

The particle size D50 of the primary cathode material particles and the number of primary cathode material particles in the composite secondary particle directly affect the particle size D50 and specific surface area of the composite secondary particles. With the same particle size of the composite secondary particle, if the particle size D50 of the primary cathode material particle is too small, the number of primary cathode material particles will be increased, resulting in an increase in the specific surface area of the composite secondary particles and an increase in the area to undergo side reactions. Moreover, if the number of primary cathode material particles in composite secondary particle is too much, primary cathode material particles will break up in the compaction of the electrode plate and the cycle process, further leading to the occurrence of new interfaces and deteriorating the battery performance. If the particle size D50 of the primary cathode material particles is too large, the number of primary cathode material particles in the composite secondary particle decreases accordingly. However, primary cathode material particles of larger particle size will directly extend the diffusion path of lithium ions, resulting in low capacity of the material, increased battery impedance, and reduced power performance.

It is found through extensive experimental data in the present disclosure that when the particle size D50 of primary cathode material particles in the composite secondary particle, the particle size D50 of the composite secondary particles, the specific surface area of the composite secondary particles, and the number of primary cathode material particles in the composite secondary particle meet the above Relation 1, a battery prepared with the cathode material has a low battery impedance, a high retention rate of cycle capacity, and a low rate of change in thickness. These indicate that the battery has less gas production, less side reactions occur between the cathode plate and the electrolyte solution, and the battery has better stability.

In some embodiments, the composite secondary particles meet: $2.5 \leq 0.1D/A + B*C \leq 9$. Experimental data shows that composite secondary particles falling in the above range have better performances.

A is in the range of: $0.5 \leq A \leq 3.5$. Further, A is in the range of: $1.5 \leq A \leq 2.5$.

In some embodiments, B is in the range of: $3 \leq B \leq 12$. Further, B is in the range of: $4.5 \leq B \leq 7$.

C is in the range of: $0.3 \leq C \leq 1.2$. Further, C is in the range of: $0.5 \leq C \leq 1.0$.

In some embodiments, D is in the range of: $1 \leq D \leq 50$. Further, D is in the range of: $3 \leq D \leq 20$.

In some embodiments, the primary cathode material particle is a cathode material having a layered structure.

The primary cathode material particle is $LiNi_xCo_yM_z$, where x is in the range of: $0.33 \leq x \leq 0.98$, y is in the range of: $0.01 \leq y \leq 0.33$, z is in the range of: $0.01 \leq z \leq 0.33$, and $x+y+z=1$; and M is at least one of Mn, Al, Zr, Ti, Y, Sr or W.

An embodiment of the present disclosure further provides a method for preparing a cathode material, which includes Step S100 and Step S200. The steps are described below.

S100: Mixing a first precursor and a second precursor and pre-sintering, to obtain a pre-sintered mixture.

The first precursor includes at least one of $Ni_eCo_fQ_g$ $(OH)_2$, $Ni_eCo_fQ_gO$, or a hydroxide or oxide of Ni, Co, Q, where e, f, and g in $Ni_eCo_fQ_g(OH)_2$ and $Ni_eCo_fQ_gO$ meet: $0.33 \leq e \leq 0.98$, $0.01 \leq f \leq 0.33$, $0.01 \leq g \leq 0.33$, and $e+f+g=1$; and Q is at least one of Mn, Al, Zr, Ti, Y, Sr or W. The second precursor includes at least one of lithium hydroxide, lithium carbonate, lithium nitrate or lithium acetate. The mole ratio of the first precursor to the second precursor is 1:(1-1.05).

In some embodiments, the pre-sintering temperature can be 200-500° C. and the pre-sintering time is 4-6 hrs. The pre-sintering process can be carried out in a roller kiln without stirring. The pre-sintering aims to volatilize the moisture in the first precursor and the second precursor, which is more conducive to the full reaction of the first precursor and the second precursor in the first sintering process and facilitates the formation of the cathode material.

S200: subjecting the pre-sintered mixture to first sintering and then to first crushing, to obtain a cathode material including multiple composite secondary particles, where each of the composite secondary particles includes multiple primary cathode material particles. After the first sintering and first crushing process are completed, the particle size D50 of the primary cathode material particles, the particle size D50 of the composite secondary particles, the specific surface area of the composite secondary particles, and the number of primary cathode material particles in the composite secondary particle are determined.

The primary cathode material particles are particles with different orientation in the cathode material as measured by electron backscatter diffraction (EBSD). Orientation refers to the orientation of a particle on an axis with any point as the origin on the interface shown. In other words, multiple particles with different orientations can be observed when the cathode material is tested by EBSD, where each particle with a different orientation is a primary cathode material particle.

The composite secondary particle is a material particle that has multiple primary cathode material particles bonded together. That is, there are multiple primary cathode material particles with different orientations in composite secondary particle.

In some embodiments, the first sintering includes sequentially a first heating stage, a first constant-temperature stage, a second heating stage, a second constant-temperature stage and a cooling stage.

A temperature of the first heating stage is 200-800° C., a time of the first heating stage is 1.5-3.5 hrs; a temperature of the first constant-temperature stage is 700-800° C., a time of the first constant-temperature stage is 5.0-8.0 hrs; a temperature of the second heating stage is 800-1100° C., a time of the second heating stage is 2.0-3.5 hrs; a temperature of the second constant-temperature stage is 1000-1100° C., and a time of the second constant-temperature stage is 8.0-10.0 hrs.

The first and second heating stage can be continuous heating, or continue heating with a short pause in each heating stage. Continuous heating is better.

The first precursor and the second precursor undergoes a thermal decomposition reaction in the first heating stage and the second heating stage. The byproducts from the decomposition include water and/or carbon dioxide. When the first precursor includes a hydroxide, the first precursor will be decomposed to produce water and a metal oxide, and the second precursor will be decomposed to produce water and lithium hydroxide. When the second precursor includes lithium carbonate, lithium carbonate will be decomposed to produce carbon dioxide and lithium oxide. Optionally, the first heating stage and the second heating stage are carried out in a heating furnace with an exhaust duct. Water vapor, carbon dioxide, and other gases produced by the thermal decomposition of the first precursor and/or the lithium source can be discharged via the exhaust duct, to speed up the decomposition reactions of the first precursor and the second precursor. Too fast heating in the first and second heating stages will cause insufficient decomposition reaction and incomplete discharge of by-products, leading to adverse effect on the subsequent solid-phase reaction. On the one hand, this causes the corrosion of the subsequent reaction equipment, and a too high free lithium content on the cathode material surface on the other hand. As a result, the impedance of the cathode material becomes large. Solid-phase reaction refers to the reaction of lithium oxide and a metal oxide to form the primary cathode material particles.

Solid-phase reactions occur in the first and second constant-temperature stages, where lithium oxide and the metal oxide are amendable to ion diffusion. The reaction temperature and reaction time of the constant-temperature stage affect the particle size and crystallization degree of the primary cathode material particles, which in turn directly affect the final performances of the cathode material. No exhaust ducts are needed in the first and second constant-temperature stages. It is to be understood that the temperature in the constant-temperature stage can fluctuate within a certain preset range, for example, the temperature in the first constant-temperature stage fluctuates between 750° C. and 780° C.

In the first sintering process, the heating stage and the constant-temperature stage occur alternately to allow the first precursor and the second precursor to react more fully.

The cooling stage includes a first sub-cooling stage and a second sub-cooling stage, a temperature of the first sub-cooling is 1100-600° C., a cooling time of the first sub-cooling is 2.5-4.0 hrs; a temperature of the second sub-cooling stage is 600-200° C., a cooling time of the second sub-cooling stage is 0.5-2.0 hrs. The first and second sub-cooling stages can be continuous cooling, or continue cooling with a short pause in each cooling stage. Continuous cooling is better.

In the cooling stage, if the material is discharged from the furnace at a higher temperature, it will cause corrosion to the subsequent equipment. If the cooling rate is too fast, large residual stress will remain in the composite secondary particles, leading to crack of the material in the subsequent use and cycle process, and affecting the performance of the material.

It is found through experiments in the present disclosure that when temperature and time of the first heating stage, the first constant-temperature stage, the second heating stage, the second constant-temperature stage and the cooling stage in the first sintering process fall within the above ranges, good performances are exhibited. After the first sintering process, the particle size of the primary cathode material particles is determined, and after the first sintering process, the primary cathode material particles will agglomerate to form an agglomerate.

The first crushing includes: ball-milling a sintered agglomerate obtained after the first sintering, to obtain a primarily crushed material, and then pneumatically crushing the primarily crushed material, in which a rotational speed of the ball-milling is 4000 r/min-8000 r/min, and a time of the ball-milling is 1.5-2.5 hrs; a pressure of pneumatic crushing is 5-10 MPa, and a time of the pneumatic crushing is 0.5-1.5 hrs. The particle size D50 of the composite secondary particles, the specific surface area of the composite secondary particles, and the number of primary cathode material particles in the composite secondary particle are determined in this step.

According to an embodiment of the present disclosure, a composite cathode material is provided, which includes any of the cathode materials as described above and a coating on a surface of the cathode material.

The coating can be a protective layer formed on the surface of the cathode material, which functions to reduce the side reaction of the cathode material with the electrolyte solution, contributes to the stability of the surface structure of the material and improves the cycle performance of the material. Alternatively, the coating is a thermal insulation layer formed on the surface of the cathode material, which functions to reduce the thermal diffusion rate of the material and improves the safety of the material.

In some embodiments, a weight proportion of the coating in the composite cathode material is 300-900 ppm. With the weight proportion falling in this range, the coating can effectively reduce the side reaction between the composite secondary particles and the electrolyte solution, reduce the gas production of the material to a certain extent, and also have a thermal insulation effect, to slow down the thermal diffusion and improve the safety performance of the material. Moreover, if the amount of the coating is too large, there will be a layer of material on the surface of the composite secondary particles that is different from the bulk structure, which is adverse to the deintercalation of lithium ions, reduces the content of active components in composite secondary particle, and is not conducive to the improvement of the specific capacity, and rate and low-temperature performances of the cathode material. If the amount of coating is too small, the thickness of the coating will be too thin; or the surface area of the composite secondary particle that can be coated is insufficient, and there will be side reactions between exposed composite secondary particles and the electrolyte solution, which is not conducive to the exertion of the performance of the material. In the present disclosure, it is found through experiments that when the weight proportion of the coating in the composite cathode material is within the above range and the above Relation 1 is met, the composite cathode material and the battery produced therewith have good performances.

In some embodiments, the material of the coating is a hydroxide and/or oxide of at least one of the elements selected from Zr, Mn, Y, Ti, W, Al, Co, B or Mg. In some embodiments, the material of the coating is at least one of $Ti_3O_4$, $Mg(OH)_2$, $W_2O_3$, $Al_2O_3$, $Co(OH)_2$ or $B(OH)_3$.

The coating can be formed on the surface of the cathode material by the following methods to obtain composite cathode material.

The cathode material and the coating material are mixed, and then subjected to second sintering; and then the mixture obtained after the second sintering is crushed to obtain the composite cathode material.

According to some embodiments of the present disclosure, the second sintering temperature is 500° C.-800° C., and the second sintering time is 5.0-8.0 h. The second crushing is done by mechanical grinding at a rotational speed of 2000-4000 r/min for a crushing time of 0.5-1 hrs. The purpose of the second sintering is to sinter the coating material on the surface of the composite secondary particles to form a coating, so as to obtain the composite cathode material. In the second sintering, some composite secondary particles are bonded through the coating material. The second crushing is to break down the composite secondary particles bonded in the second sintering process, and break down the coating material between the composite secondary particles. The particle size of composite secondary particles will not be affected when the parameters in the above range are adopted in the second crushing process.

The present disclosure further provides a battery, which includes a cathode plate including a current collector and a cathode active material layer is disposed on the current collector, where the cathode active material layer includes any of the composite cathode materials as described above. The cathode active material layer is a coating formed by coating a cathode paste on the current collector.

In the present disclosure, the cathode plate includes the composite cathode material mentioned above, which allows the cathode plate to have a compacted density of 3.5 g/mm³ or higher. The intensity ratio of peak in orientation 003 to peak in orientation 110 is low, and expansion tends not to occur during the charge and discharge process.

The battery includes the cathode plate as described above, which reduces the impedance of the battery and the rate of change in thickness of the battery during storage at high temperature, and improves the capacity retention rate of the battery after 500 cycles and the electrical performance of the battery.

In some embodiments, the cathode paste further includes a conductive agent and a binder, where the weight ratio of the composite cathode material, the conductive agent and the binder is 100:(0.5-2):(0.5-2). In other words, the cathode active material layer includes the composite cathode material, a conductive agent and a binder, where the weight ratio of the composite cathode material, the conductive agent and the binder is 100:(0.5-2):(0.5-2).

The conductive agent includes at least one of carbon tubes, carbon black or graphene. In some embodiments, the conductive agent includes carbon tubes, carbon black, and graphene.

The binder includes a first copolymer obtained by the copolymerization of vinylidene fluoride with an ethylene compound containing an active group and a second copolymer obtained by the copolymerization of vinylidene fluoride with trifluorochloroethylene. In the first copolymer, the weight ratio of vinylidene fluoride to the ethylene compound containing an active group is (85.00-99.99):(0.01-15.00). The active group include at least one of carboxyl, epoxy, hydroxyl or sulfonic acid groups. In the second copolymer, the weight ratio of vinylidene fluoride to trifluorochloroethylene is (85.00-99.05):(0.05-15.00).

To well illustrate the technical solutions of the present disclosure, description is made below in connection with specific embodiments.

EMBODIMENTS

Preparation of Cathode Material:

Step S100: A nickel-cobalt-manganese precursor is mixed with a second precursor and pre-sintered in a roller kiln. In this embodiment, the nickel-cobalt-manganese precursor is $Ni_{0.7}Co_{0.1}Mn_{0.2}(OH)_2$, the second precursor is lithium hydroxide, the presintering temperature is 200° C.-500° C., and the pre-sintering time is 4-6 hrs.

Step S200: The obtained pre-sintered mixture is subjected to first sintering, and then crushed after the first sintering is completed, to a cathode material. The first sintering includes sequentially a first heating stage, a first constant-temperature stage, a second heating stage, a second constant-temperature stage and a cooling stage. The temperature of the first heating stage is 200-800° C., the time of the first heating stage is 1.5-3.5 hrs; the temperature of the first constant-temperature stage is 700-800° C., the time of the first constant-temperature stage is 5.0-8.0 hrs; the temperature of the second heating stage is 800-1100° C., the time of the second heating stage is 2.0-3.5 hrs; the temperature of the second constant-temperature stage is 1000-1100° C., and the time of the second constant-temperature stage is 8.0-10.0 hrs. The cooling stage includes a first cooling stage and a second sub-cooling stage, a temperature of the first sub-cooling is 1100-600° C., a cooling time of the first sub-cooling is 2.5-4.0 hrs; a temperature of the second sub-cooling stage is 600-200° C., a cooling time of the second sub-cooling stage is 0.5-2.0 hrs. The first crushing includes ball-milling the sintered agglomerate obtained after the first sintering, to obtain a primarily crushed material, and then pneumatically crushing the primarily crushed material, in which the rotational speed of the ball-milling is 4000 r/min-8000 r/min, and a time of the ball-milling is 1.5-2.5 hrs; and a pressure of the pneumatic crushing is 5-10 MPa, and a time of the pneumatic crushing is 0.5-1.5 hrs.

The obtained cathode material includes multiple composite secondary particles, and each of the composite secondary particles includes multiple primary cathode material particles. The primary cathode material particle is a cathode material with a layered structure, and having a chemical formula of $LiNi_{0.7}Co_{0.1}Mn_{0.2}$.

According to the method in the above embodiment, various cathode materials are obtained by adjusting the preparation parameters. The particle size D50 of the cathode material, the specific surface area of the composite secondary particles, the number of the primary cathode material particles in the composite secondary particle, and the particle size D50 of the primary cathode material particles are tested, and summarized in Table 1, where A represents the particle size D50 of primary cathode material particles (unit: μm). B represents the particle size D50 of the composite secondary particles, unit: μm; C represents a specific surface area of the composite secondary particles, unit: m²/g; and D represents a number of the primary cathode material particles in composite secondary particle. The test methods of various items are as follows:

Test method of particle size D50 of primary cathode material particles: Using a CP-SEM images at 5000×, the long-axis dimensions of about 300 primary cathode material particles are statistically calculated and the statistical distribution of the data is obtained, to obtain the particle size D50 of the primary cathode material particles.

Test method of particle size D50 of composite secondary particles: Test instrument: Laser particle size analyzer, reference model Malvern 2000/3000. Test method: The material is dispersed in deionized water, ultrasonicated for 10 min, and tested, to obtain the particle size D50 of the composite secondary particle.

Test method of specific surface area of composite secondary particles: The gas adsorption method is used for multi-point test, and the test standard is ISO-9277/GB/T19587-2004.

Test method of number of primary cathode material particles in composite secondary particle: The orientations of primary cathode material particles in the composite secondary particle is measured by EBSD. Different primary cathode material particles have different orientations and is shown with different colors in EBSD. In an EBSD image of 10K, the average number of primary cathode material particles in the composite secondary particles in a unit area of 10 μm×10 μm is calculated. Then the average number of primary cathode material particles in a composite secondary particle is obtained according to the area of a composite secondary particle.

Preparation of composite cathode material: The prepared cathode material and the coating material are mixed, and then subjected to second sintering; and then the mixture obtained after the second sintering is crushed to obtain the composite cathode material. In this embodiment, the coating material is $Ti_3O_4$, and the content of the coating material in the composite cathode material is 300-900 ppm. The second sintering temperature is 500-800° C. and the second sintering time is 5-8 hrs. The second crushing is done by mechanical grinding at a rotational speed of 2000-4000 r/min for a crushing time of 0.5-1 hrs.

Preparation of cathode paste: The prepared composite cathode material is mixed with a conductive agent and a binder at a weight ratio of 100:1.2:1.2 to prepare a cathode paste. The conductive agent includes carbon tube, carbon black and graphene at a weight ratio of 0.6:0.5:0.3. The binder includes a first copolymer obtained by the copolymerization of vinylidene fluoride with an ethylene compound containing an active group and a second copolymer obtained by the copolymerization of vinylidene fluoride with trifluorochloroethylene at a molar ratio of 1:1. In the first copolymer, the weight ratio of vinylidene fluoride to the ethylene compound containing an active group is 95.00: 5.00, and the active group includes carboxyl groups. In the second copolymer, the weight ratio of vinylidene fluoride to trifluorochloroethylene is 96.00:4.00.

The prepared cathode paste is tested for the performances, including compacted density test of electrode plate, post-compaction orientation test of electrode plate, battery impedance test, cycle performance test and storage performance test.

Compacted density test of electrode plate: The cathode paste prepared in each embodiment is coated on an electrode plate to form an uncompacted cathode plate. The uncompacted cathode plate is prepared into a size of 40*100 mm, and compacted by Daye compacting machine, and the electrode density of the plate is calculated according to the areal density and the thickness after compaction of the plate.

Post-compaction orientation test of electrode plate This parameter is determined according to JY/T 009-1996 General rules for X-ray polycrystalline diffractometry. and characterized by the peak intensity ratios of (003) and (110).

Battery impedance test: The prepared cathode material is fabricated into a corresponding battery. The battery is adjusted to 60% of SOC, and DCIR of the battery is tested at a current of 3 C and a charge and discharge time of 10 s. The battery impedance is characterized by a product of the DCIR value of the battery multiplying the discharge capacity at ⅓C of the battery.

Cycle performance test: The prepared cathode material is fabricated into a corresponding battery. The test method includes: temperature condition: 45±5° C.; charge: charge to 4.2 V at a constant current of 1 C; and discharge: discharge to 2.5 V at a constant current of 1 C. After 500 cycles, the capacity retention rate is calculated with the discharge capacity Cl of the first cycle as a reference, and recorded as C500 after cycles at 45° C. in Table 2.

Storage performance test: The prepared cathode material is fabricated into a corresponding battery. The battery is charged to 4.2V at a constant current of 0.2 C, and placed at room temperature for 2 hrs. The initial thickness of the battery is recorded. The battery is stored in a constant-temperature cabinet at 60° C. for 28 days, and the thickness after storage is recorded. The rate of change in thickness is calculated, and recorded as rate of change in thickness at 60-28D in Table 2.

TABLE 1

| Embodiments | Values of A, B, C, and D | | | | 0.1 D/A + B * C |
|---|---|---|---|---|---|
| Embodiment 1 | A = 0.5 | B = 6.0 | C = 0.7 | D = 15 | 7.2 |
| Embodiment 2 | A = 1.0 | B = 5.0 | C = 1.0 | D = 8 | 5.8 |
| Embodiment 3 | A = 1.5 | B = 5.0 | C = 1.0 | D = 9 | 5.6 |
| Embodiment 4 | A = 2.5 | B = 6.0 | C = 0.8 | D = 5 | 5.0 |
| Embodiment 5 | A = 3.0 | B = 9.0 | C = 0.4 | D = 5 | 4.2 |
| Embodiment 6 | A = 1.5 | B = 4.0 | C = 0.5 | D = 8 | 2.5 |
| Embodiment 7 | A = 0.5 | B = 6.0 | C = 1.2 | D = 10 | 9.2 |
| Embodiment 8 | A = 3.0 | B = 6.0 | C = 0.1 | D = 15 | 1.1 |
| Embodiment 9 | A = 0.9 | B = 12.0 | C = 1.2 | D = 50 | 19.96 |
| Comparative Embodiment 1 | A = 0.5 | B = 10.3 | C = 1.0 | D = 100 | 30.3 |
| Comparative Embodiment 2 | A = 4.0 | B = 8.0 | C = 0.1 | D = 3 | 0.875 |
| Comparative Embodiment 3 | A = 0.1 | B = 10.0 | C = 3.5 | D = 100 | 135 |
| Comparative Embodiment 4 | A = 2 | B = 2 | C = 0.2 | D = 1 | 0.45 |
| Comparative Embodiment 5 | A = 2 | B = 2 | C = 0.1 | D = 2 | 0.3 |
| Comparative Embodiment 6 | A = 2 | B = 2 | C = 0.3 | D = 3 | 0.75 |
| Comparative Embodiment 7 | A = 0.2 | B = 5 | C = 1.3 | D = 50 | 31.5 |
| Comparative Embodiment 8 | A = 1.5 | B = 15 | C = 0.5 | D = 30 | 27.5 |

TABLE 1-continued

| Embodiments | Values of A, B, C, and D | | | | 0.1 D/A + B * C |
|---|---|---|---|---|---|
| Comparative Embodiment 9 | A = 1.5 | B = 2.5 | C = 0.7 | D = 2 | 0.88 |
| Comparative Embodiment 10 | A = 1.5 | B = 25 | C = 0.6 | D = 100 | 21.67 |
| Comparative Embodiment 11 | A = 1.5 | B = 2 | C = 2.0 | D = 1 | 4.07 |
| Comparative Embodiment 12 | A = 0.5 | B = 6 | C = 0.7 | D = 15 | 7.2 |
| Comparative Embodiment 13 | A = 3 | B = 3 | C = 0.1 | D = 1 | 0.63 |
| Comparative Embodiment 14 | A = 0.05 | B = 13 | C = 0.8 | D = 1000 | 2010.4 |

In Comparative Embodiments 1-3, the composite secondary particles are prepared in accordance with a method different from that in the above embodiments, and the values of A, B, C and D in the composite secondary particle are shown in Table 1.

Comparative Embodiments 4-14 are supplemented in the present disclosure.

Comparative Embodiment 4: The preparation method in Comparative Embodiment 4 is substantially the same as that in Embodiment 1, except that instead of employing alternate heating stage and constant-temperature stage in the first sintering, the sintering is carried out by directing heating to 1000° C.–1100° C., and the sintering time is the same as that in Embodiment 1.

Comparative Embodiment 5: The preparation method in Comparative Embodiment 5 is substantially the same as that in Embodiment 1, except that instead of employing alternate heating stage and constant-temperature stage in the first sintering the sintering includes three sintering stages, that is, a first sintering stage at a temperature of 400-600° C. for 4 hrs, a second sintering stage at a temperature of 600-700 for 4 hrs, and a third sintering stage at a temperature of 700-900° C. for 13 hrs.

Comparative Embodiment 6: The preparation method in Comparative Embodiment 6 is substantially the same as that in Embodiment 1, except that the sintering includes one heating stage and one constant-temperature stage, in which the temperature in the heating stage is 200-1100° C., and the time of the heating stage is the same as the total time of the first heating stage and the second heating stage in Embodiment 1; and the temperature in the constant-temperature stage is 1000-1100° C., and the time of the constant-temperature stage is the same as the total time of the first constant-temperature stage and the second constant-temperature stage in Embodiment 1.

Comparative Embodiment 7: The preparation method in Comparative Embodiment 7 is substantially the same as that in Embodiment 1, except that the cooling time in the cooling stage is 1 hr, that is, the cooling time in Comparative Embodiment 7 is far less than the cooling time in Embodiment 1.

Comparative Embodiment 8: The preparation method in Comparative Embodiment 8 is substantially the same as that in Embodiment 1, except that the rotational speed of the ball-milling in the first crushing process is 2000 r/min, which is less than the rotational speed of the ball-milling in Embodiment 1.

Comparative Embodiment 9: The preparation method in Comparative Embodiment 9 is substantially the same as that in Embodiment 1, except that the rotational speed of the ball-milling in the first crushing process is 10000 r/min, which is greater than the rotational speed of the ball-milling in Embodiment 1.

Comparative Embodiment 10: The preparation method in Comparative Embodiment 10 is substantially the same as that in Embodiment 1, except that the pneumatic crushing pressure is 3 MPa, which is less than the pneumatic crushing pressure in Embodiment 1.

Comparative Embodiment 11: The preparation method in Comparative Embodiment 11 is substantially the same as that in Embodiment 1, except that the pneumatic crushing pressure is 20 MPa, which is greater than the pneumatic crushing pressure in Embodiment 1.

Comparative Embodiment 12: The preparation method in Comparative Embodiment 12 is substantially the same as that in Embodiment 1, except that the amount of the coating material added in Step S300 is 2000 ppm.

Comparative Embodiment 13: Small particle material consisting of 1-3 primary cathode material particles is prepared, in which the primary cathode material particle is $LiNi_{0.7}Co_{0.1}Mn_{0.2}$.

Comparative Embodiment 14: Secondary particle material consisting of multiple primary cathode material particles and having a particle size D50 of 50 μm is prepared. That is, the secondary particle material has many primary cathode material particles herein, where the primary cathode material particle is $LiNi_{0.7}Co_{0.1}Mn_{0.2}$.

The performances of the cathode materials prepared in Embodiments 1-9 and Comparative Embodiments 1-14 are tested. The performance and effect data are shown in Table 2.

TABLE 2

| Examples | Compacted density of electrode plate (g/cm3) | Post-compaction orientation of electrode plate (003)/(110) | Battery impedance (mΩ · Ah) | C500 after cycles at 45° C. (%) | Rate of change in thickness at 60° C.-28 D (%) |
|---|---|---|---|---|---|
| Embodiment 1 | 3.50 | 29 | 55 | 89 | 10 |
| Embodiment 2 | 3.65 | 35 | 58 | 91 | 8 |

TABLE 2-continued

| Examples | Compacted density of electrode plate (g/cm3) | Post-compaction orientation of electrode plate (003)/(110) | Battery impedance (mΩ · Ah) | C500 after cycles at 45° C. (%) | Rate of change in thickness at 60° C.-28 D (%) |
|---|---|---|---|---|---|
| Embodiment 3 | 3.70 | 30 | 60 | 95 | 6 |
| Embodiment 4 | 3.65 | 29 | 55 | 93 | 7 |
| Embodiment 5 | 3.60 | 25 | 60 | 87 | 9 |
| Embodiment 6 | 3.64 | 32 | 56 | 90 | 8 |
| Embodiment 7 | 3.60 | 28 | 54 | 87 | 11 |
| Embodiment 8 | 3.53 | 30 | 65 | 90 | 6 |
| Embodiment 9 | 3.52 | 25 | 50 | 85 | 12 |
| Comparative Embodiment 1 | 3.50 | 20 | 52 | 80 | 18 |
| Comparative Embodiment 2 | 3.30 | 20 | 68 | 70 | 20 |
| Comparative Embodiment 3 | 3.40 | 45 | 100 | 82 | 14 |
| Comparative Embodiment 4 | 3.10 | The material has low degree of crystallization and is not a typical cathode material. | 200 | 60 | 29 |
| Comparative Embodiment 5 | 3.25 | | 150 | 65 | 24 |
| Comparative Embodiment 6 | 3.15 | | 180 | 61 | 28 |
| Comparative Embodiment 7 | 3.11 | 20 | 55 | 60 | 30 |
| Comparative Embodiment 8 | 3.3 | 40 | 250 | 75 | 13 |
| Comparative Embodiment 9 | 2.8 | 25 | 50 | 74 | 24 |
| Comparative Embodiment 10 | 3.0 | 50 | 190 | 78 | 15 |
| Comparative Embodiment 11 | 2.9 | 20 | 66 | 63 | 29 |
| Comparative Embodiment 12 | 3.56 | 28 | 80 | 90 | 7 |
| Comparative Embodiment 13 | 3.55 | 60 | 110 | 88 | 9 |
| Comparative Embodiment 14 | 3.61 | 10 | 40 | 70 | 25 |

As can be seen from the experimental data in Table 2, the cathode materials prepared in Embodiments 1-9 have better performances and effects. The compacted density of the electrode plate is up to 3.70 g/cm³. A higher compacted density of the electrode plate indicates a higher energy density of the cathode material. As for the post-compaction orientation of the electrode plate, the intensity ratio of peak 003/peak 110 is as low as 25. A lower ratio indicates a poor orientation of the cathode material, which alleviates the expansion of the electrode plate during charge and discharge. The battery impedance is as low as 50 mΩ. A lower battery impedance indicates a good electrical conductivity of the battery. As for the cycle performance, the C500 value (capacity retention rate) after cycles at 45° C. is up to 95% and at least 85%, indicating a good cycle performance. As for the storage performance, the rate of change in thickness at 60° C.-28D is as low as 6%. A lower rate of change in thickness indicates a good and stable storage performance of the battery.

It can be seen from Comparative Embodiment 1 that when the value of Relation 1 is not within the range defined in the present disclosure and the number of primary cathode material particles in the composite secondary particle is too much, the primary cathode material particles will break up in the compaction of the electrode plate and the cycle process, further leading to the occurrence of new interfaces and deteriorating the battery performance. The post-compaction orientation of the electrode plate, the cycle performance, and the storage performance are poor in Comparative Example 1.

It can be seen from Comparative Example 2 that when the value of Relation 1 is not within the range defined in the present disclosure and the particle size D50 of primary cathode material particles is too large, the length of the diffusion path of lithium ions will be directly affected, resulting in low capacity of the material, increased battery impedance, and deteriorated cycle performance and storage performance. The cycle performance and storage performance are poor in Comparative Example 2.

It can be seen from Comparative Example 3 that the value of Relation 1 is not within the range defined in the present disclosure, the specific surface area of composite secondary particles is too large, and the number of primary cathode material particles in the composite secondary particle is too much. The too large specific surface area of the composite secondary particles causes increased side reactions between the composite secondary particles and the electrolyte solution, serious gas production, and deteriorated cycle performance of the battery. When the number of primary cathode material particles in the composite secondary particle is too much, the primary cathode material particles will break up in the compaction of the electrode plate and the cycle process, further leading to the occurrence of new interfaces and deteriorating the battery performance. The compacted density of the electrode plate, the post-compaction orientation of the electrode plate, the battery impedance, the cycle performance, and the storage performance are poor in Comparative Example 3.

It can be seen from Comparative Example 4 that the performance data of the composite secondary particle prepared without sintering in different temperature ranges and in alternate heating and constant-temperature stages is slightly worse than that in Embodiments 1-9, but better than that in Comparative Examples 1-3. This indicates that a cathode material meeting Relation 1 in the present disclosure can be conveniently formed using the first sintering process in the present disclosure.

It can be seen from Comparative Example 5 that the performance data of the composite secondary particle prepared by sintering in different temperature ranges, but without alternate heating and constant-temperature stages is slightly worse than that in Embodiments 1-9, but better than that in Comparative Examples 1-3. This indicates that a cathode material meeting Relation 1 in the present disclosure can be conveniently formed using the first sintering process in the present disclosure.

It can be seen from Comparative Example 6 and Comparative Example 7 that a cathode material meeting Relation 1 in the present disclosure can be conveniently formed using a first sintering process falling in the range of the present disclosure. In Comparative Example 6, only one heating stage and one constant-temperature are used, which cause the earlier thermal decomposition of the lithium source and the precursor material to be inadequate, resulting in insufficient removal of moisture or $CO_2$, and insufficient crystallization of the cathode material during the sintering process. In Comparative Example 7, the cooling rate is too fast, and large residual stress is caused to remain in the composite secondary particles. As a result, large stress remains inside the material particles after the material is sharply cooled, and the primary cathode material particles and composite secondary particles break up to different degrees, and crack in the subsequent use and cycle process, affecting the performance of the material.

It can be seen from Comparative Example 8 and Comparative Example 9 that a cathode material meeting Relation 1 in the present disclosure can be conveniently formed using a rotational speed of ball-milling falling in the range the present disclosure. A too fast rotational speed of ball-milling will result in a too small composite secondary particle, and a too slow rotational speed of ball-milling will result in a too large composite secondary particle, affecting the performance of the material.

It can be seen from Comparative Example 10 and Comparative Example 11 that a cathode material meeting Relation 1 in the present disclosure can be conveniently formed using a pneumatic crushing pressure falling in the range the present disclosure. A too small pneumatic crushing pressure will result in a too large composite secondary particle and a widened particle size distribution of the composite secondary particles, and a too large pneumatic crushing pressure will result in a too small composite secondary particle, and a widened particle size distribution of the composite secondary particles, so more fine powder is produced, affecting the performance of the material.

It can be seen from Comparative Example 12 that if more coating material is coated on the surface of the cathode material, the intercalation/deintercation of lithium becomes difficult in the charge and discharge process of the material. In Comparative Example 12, the battery impedance is increased, but the cycle performance and storage performance are still better than those in Comparative Examples 1-5.

It can be seen from Comparative Examples 13 and 14 that if the small particle material and secondary particle material do not meet Relation 1 in the present disclosure, the performance is poor.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A cathode material, comprising: a plurality of composite secondary particles, each of the composite secondary particles comprising a plurality of primary cathode material particles, wherein the composite secondary particles meet Relation 1:

$$0.9 \leq 0.1D/A + B^*C \leq 20 \qquad \text{(Relation 1)}$$

where A represents a particle size D50 of the primary cathode material particles, unit: μm; B represents a particle size D50 of the composite secondary particles, unit: μm; C represents a specific surface area of the composite secondary particles, unit: m²/g; and D represents a number of the primary cathode material particles in each of the composite secondary particles, wherein A is in the range of: 0.5≤A≤3.5, B is in the range of: 3≤B≤12, C is in the range of: 0.5≤C≤1.0, and D is in the range of: 1≤D≤50.

2. The cathode material according to claim 1, wherein: the primary cathode material particle is $LiNi_xCo_yM_z$, in which x is in the range of: 0.335≤x≤0.98, y is in the range of: 0.01≤y≤0.33, z is in the range of: 0.01≤z≤0.33, and x+y+z=1; and M is at least one of Mn, Al, Zr, Ti, Y, Sr, or W.

3. The cathode material according to claim 2, wherein: the primary cathode material particle is $LiNi_xCo_yM_z$, in which x is in the range of: 0.33≤x≤0.98, y is in the range of: 0.01≤y≤0.33, z is in the range of: 0.01≤z≤0.33, and x+y+z=1; and M is at least one of Mn, Al, Zr, Ti, Y, Sr, or W.

4. A composite cathode material, comprising: a cathode material according to claim 1 and a coating on a surface of the cathode material.

5. The composite cathode material according to claim 4, wherein a weight proportion of the coating in the composite cathode material is 300-900 ppm.

6. A battery, comprising: a cathode plate, comprising a current collector and a cathode active material layer is disposed on the current collector, wherein the cathode active material layer comprises a composite cathode material according to claim 4.

* * * * *